United States Patent
Reybrouck et al.

(10) Patent No.: US 9,739,330 B2
(45) Date of Patent: Aug. 22, 2017

(54) DOUBLE TUBE DAMPER WITH STRUCTURAL PRESSURE TUBE

(71) Applicant: Tenneco Automotive Operating Company Inc., Lake Forest, IL (US)

(72) Inventors: Koenraad Reybrouck, Brussels (BE); Thomas P. Mallin, Temperance, MI (US); Piotr Grzanka, Gliwice (PL); Jacek Cylok, Mikolow (PL); Frederik Balcaen, Welle (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/991,306

(22) Filed: Jan. 8, 2016

(65) Prior Publication Data

US 2016/0201751 A1    Jul. 14, 2016

Related U.S. Application Data

(60) Provisional application No. 62/101,401, filed on Jan. 9, 2015.

(51) Int. Cl.
*F16F 9/18* (2006.01)
*B60G 13/08* (2006.01)
*F16F 9/32* (2006.01)

(52) U.S. Cl.
CPC .............. *F16F 9/185* (2013.01); *B60G 13/08* (2013.01); *F16F 9/3257* (2013.01); *F16F 9/3271* (2013.01); *F16F 2226/04* (2013.01)

(58) Field of Classification Search
CPC ........ F16F 9/185; F16F 9/3257; F16F 9/3271; B60G 13/08
See application file for complete search history.

(56) References Cited

U.S. PATENT DOCUMENTS

| | | | |
|---|---|---|---|
| 2,452,885 A | * 11/1948 | Willard | F16F 9/185 188/315 |
| 2,546,051 A | * 3/1951 | Whisler, Jr. | F16F 9/185 188/315 |

(Continued)

FOREIGN PATENT DOCUMENTS

| | | |
|---|---|---|
| DE | 102011076200 A1 | 11/2012 |
| DE | 102011087597 A1 | 6/2013 |

(Continued)

OTHER PUBLICATIONS

International Search Report and Written Opinion dated Mar. 30, 2016 in corresponding PCT Application No. PCT/US2016/012677 (10 pages).

*Primary Examiner* — Vishal Sahni
(74) *Attorney, Agent, or Firm* — Harness, Dickey & Pierce, P.L.C.

(57) ABSTRACT

The present disclosure relates to a shock absorber having a pressure tube which defines a fluid chamber, and a piston assembly. The piston assembly is disposed within the fluid chamber and divides the fluid chamber into upper and lower working chambers. A reserve tube surrounds the pressure tube to define a reservoir chamber between the reserve tube and the pressure tube. The pressure tube is disposed between a rod guide assembly and a lower mount. A structural integrity of the pressure tube is greater than a structural integrity of the reserve tube, and the pressure tube further operates as a principal load bearing component for the shock absorber.

14 Claims, 10 Drawing Sheets

(56) References Cited

U.S. PATENT DOCUMENTS

| | | | | |
|---|---|---|---|---|
| 4,854,428 | A | * | 8/1989 | Horvath .................... A61F 2/68 188/298 |
| 5,522,481 | A | * | 6/1996 | Watanabe ............... F16F 9/532 188/267.1 |
| 6,318,525 | B1 | | 11/2001 | Vignocchi et al. |
| 8,689,953 | B2 | | 4/2014 | Bauman et al. |
| 2005/0121274 | A1 | | 6/2005 | Fujita et al. |
| 2008/0224437 | A1 | | 9/2008 | Vanhees |
| 2011/0266727 | A1 | | 11/2011 | Knevels |
| 2013/0081913 | A1 | | 4/2013 | Nowaczyk et al. |

FOREIGN PATENT DOCUMENTS

| | | |
|---|---|---|
| DE | 102012206458 B3 | 7/2013 |
| DE | 102012207343 A1 | 11/2013 |
| DE | 102013208259 A1 | 11/2014 |
| EP | 2249058 A2 | 11/2010 |
| GB | 1491251 A | 11/1977 |

\* cited by examiner

DOUBLE TUBE DAMPER WITH STRUCTURAL PRESSURE TUBE

CROSS-REFERENCE TO RELATED APPLICATIONS

This application claims the benefit of U.S. Provisional Application No. 62/101,401, filed on Jan. 9, 2015. The entire disclosure of the above application is incorporated herein by reference.

FIELD

The present disclosure relates generally to hydraulic dampers or shock absorbers for use in a suspension system such as a suspension system used for automotive vehicles. More particularly, the present disclosure relates to a dual tube hydraulic damper having a structural pressure tube which provides the structural strength for the hydraulic damper.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to one of the unsprung and sprung portions of the vehicle. The piston is connected to the other of the sprung portion and unsprung portion of the automobile through a piston rod which extends through the pressure tube. The piston divides the pressure tube into an upper working chamber and a lower working chamber both of which are filled with hydraulic fluid. Because the piston is able, through valving, to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. During driving, the suspension system moves in jounce (compression) and rebound (extension). During jounce movements, the shock absorber is compressed causing damping fluid to move through the base valve in a dual-tube shock absorber. A damping valve located on the base valve controls the flow of damping fluid and thus the damping force created. During rebound movements, the shock absorber is extended causing damping fluid to move through the piston in the dual-tube shock absorber. A damping valve located on the piston controls the flow of damping fluid and thus the damping force created.

In a dual-tube shock absorber, the piston and the base valve both normally include a plurality of compression passages and a plurality of extension passages. During jounce (compression) movements in a dual-tube shock absorber, the damping valve or the base valve opens the compression passages in the base valve to control fluid flow and produce a damping load. A check valve on the piston opens the compression passages in the piston to replace damping fluid in the upper working chamber but this check valve may or may not contribute to the damping load. The damping valve on the piston closes the extension passages of the piston and a check valve on the base valve closes the extension passages of the base valve during a compression movement. During rebound (extension) movements in a dual-tube shock absorber, the damping valve on the piston opens the extension passages in the piston to control fluid flow and produce a damping load. A check valve on the base valve opens the extension passages in the base valve to replace damping fluid in the lower working chamber but this check valve may or may not contribute to the damping load.

Prior art double tube shock absorber structure is built by using a steel reserve tube. The prior art pressure tube has a thin wall thickness just to hold and guide valving elements. Double tube steel construction is heavy and requires a painting process to fulfill corrosion requirements. Painting processes bring contamination issues and can negatively influence manufacturing costs. Prior art shocks require a base valve assembly arc welding and a rolling process for closing of the reserve tube. Arc welding is a process with high energy consumption and is a source of contamination. Roll closing imposes a need for a high strength rod guide and an oil seal washer.

SUMMARY

This section provides a general summary of the disclosure, and is not a comprehensive disclosure of its full scope or all of its features.

The present disclosure generally relates to a dual-tube hydraulic damper or shock absorber which includes a simple, light weight shock absorber. Structural strength of the shock absorber is provided by a strong inner or pressure tube. The outer or reserve tube is utilized to maintain fluid in the reservoir, and needs to be air tight and able to resist impacts from the outside. The structural strength of the shock absorber is provided by the pressure tube and not the reserve tube. Thus, a lower cost, simpler and lighter weight shock absorber can be provided.

In one particular aspect the present disclosure relates to a shock absorber having a pressure tube which defines a fluid chamber, and a piston assembly. The piston assembly is disposed within the fluid chamber and divides the fluid chamber into upper and lower working chambers. A reserve tube surrounds the pressure tube to define a reservoir chamber between the reserve tube and the pressure tube. The pressure tube extends between a rod guide and a lower mount. A structural integrity of the pressure tube is greater than a structural integrity of the reserve tube. This enables the pressure tube to operate as the principal load bearing component for the shock absorber with the reserve tube providing no load bearing operation.

In another particular aspect the present disclosure relates to a shock absorber having a pressure tube defining a fluid chamber, and a piston assembly disposed within the fluid chamber. The piston assembly divides the fluid chamber into an upper working chamber and a lower working chamber. A reserve tube surrounds the pressure tube. A reservoir chamber is defined between the reserve tube and said pressure tube. A structural integrity of the pressure tube is greater than a structural integrity of the reserve tube. The reserve tube is further defined such it has a first portion which is non-flexible and a second portion which is flexible. The reserve tube provides no load bearing operation for the shock absorber.

In still another aspect the present disclosure relates to a method for forming a shock absorber. The method involves using a pressure tube to define a fluid chamber and arranging a piston assembly within the fluid chamber. The pressure tube is operably secured at a distal end to a lower mount. The piston assembly divides the fluid chamber into an upper working chamber and a lower working chamber. A reserve tube is arranged to surround the pressure tube such that a reservoir chamber is defined between the reserve tube and the pressure tube. The method further involves forming the pressure tube from at least one of a material thickness or a material type to provide a first structural strength, and forming the reserve tube from at least one of a material thickness or a material type to provide a second structural strength. The method further provides for selecting the first and second structural strengths such that the second structural strength is less than the first structural strength. The pressure tube thus forms a principal load bearing component for the shock absorber, while the reserve tube provides no load bearing operation for the shock absorber.

In still another aspect the present disclosure relates to a shock absorber comprising a pressure tube which defines a fluid chamber. A piston assembly is included which is disposed within the fluid chamber, the piston assembly dividing the fluid chamber into an upper working chamber and a lower working chamber. A lower mount is included to which a first end of the pressure tube is operably secured. A rod guide assembly is also included to which a second end of the pressure tube is operably secured. A bumper cap is operably associated with the rod guide assembly. A reserve tube is included which surrounds the pressure tube and extends between the bumper cap and the lower mount. A reservoir chamber is thus defined between the reserve tube and the pressure tube. A structural integrity of the pressure tube is greater than a structural integrity of the reserve tube. Furthermore, the reserve tube is at least one of configured or secured to the lower mount and the bumper cap, to enable a degree of movement of the reserve tube relative to the pressure tube.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
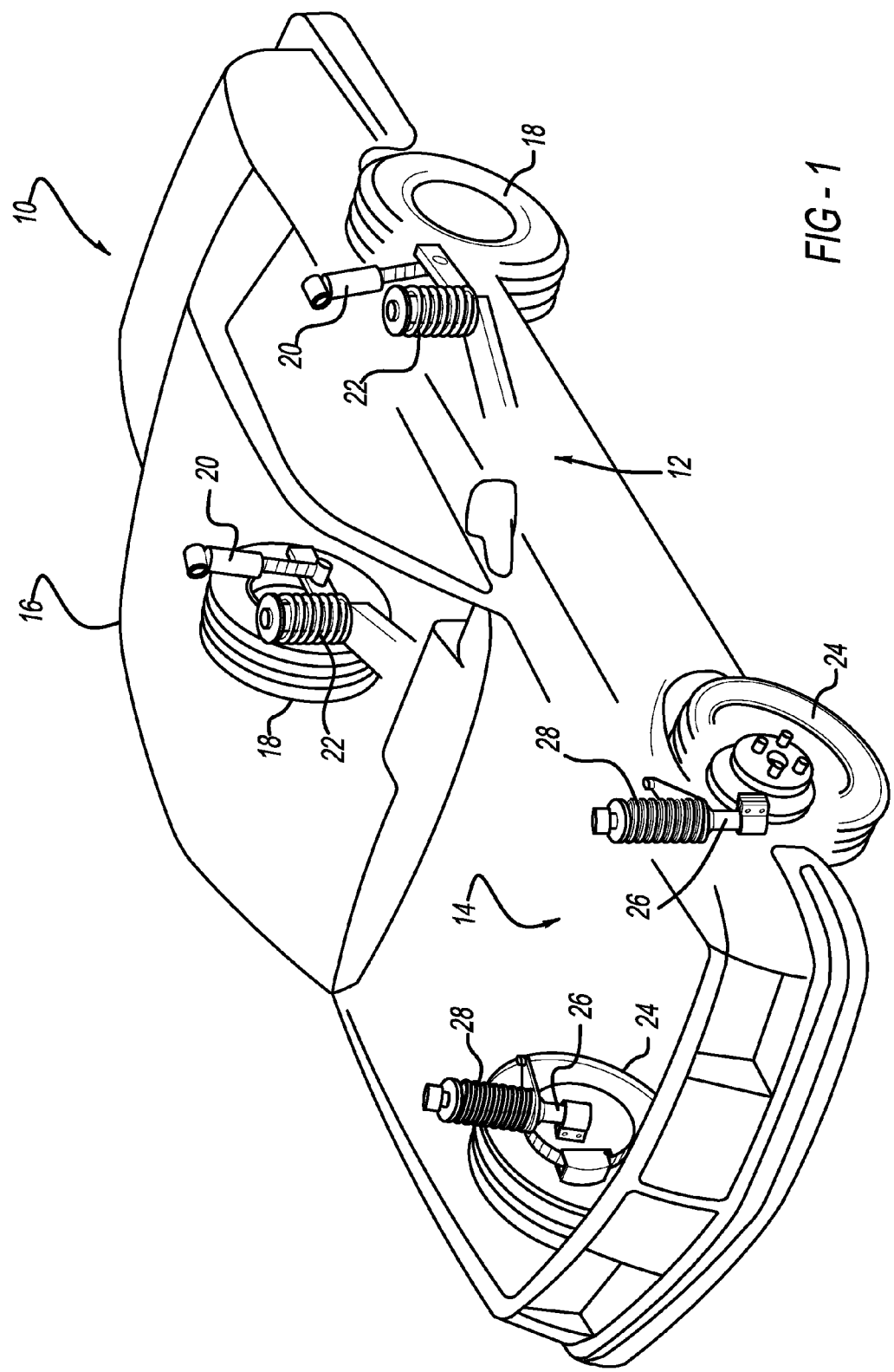
FIG. 1 is an illustration of an automobile having shock absorbers which incorporate the shock absorber in accordance with the present disclosure.

The following description is merely exemplary in nature and is not intended to limit the present disclosure, application, or uses. There is shown in FIG. 1 a vehicle incorporating a suspension system having shock absorbers, each of which incorporates pressure and reserve tubes in accordance with the present invention, and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include struts and other damper designs known in the art.

Figure 2:
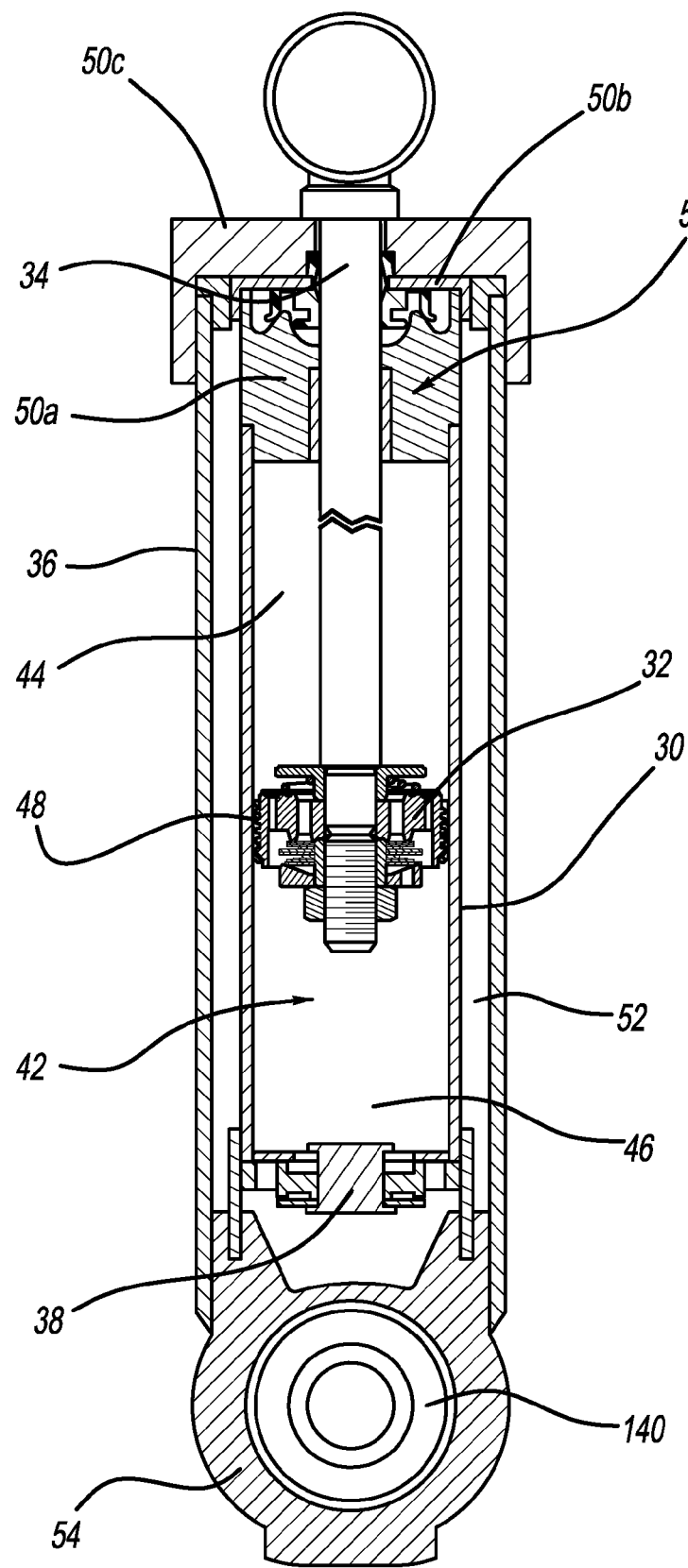
FIG. 2 is a side view, partially in cross-section, of a dual-tube shock absorber from FIG. 1 which incorporates the pressure and reserve tubes in accordance with the present disclosure.

Referring now to FIG. 2, shock absorber 20 is shown in greater detail. While FIG. 2 illustrates only shock absorber 20, it is to be understood that shock absorber 26 also includes the pressure and reserve tube designs described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod assembly 34, a reserve tube 36 and a base valve assembly 38.

Pressure tube 30 can be manufactured from a plastic material, a metal material such as aluminum or steel or any other material which meets the performance requirements. Pressure tube 30 defines a fluid chamber 42. Piston assembly 32 is slidably disposed within pressure tube 30 and divides fluid chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod assembly 34 is attached to piston assembly 32 and extends through upper working chamber 44 and through a rod guide assembly 50 which closes the upper end of pressure tube 30. A sealing system seals the interface between rod guide assembly 50, reserve tube 36, pressure tube 30 and piston rod assembly 34. The end of piston rod assembly 34 opposite to piston assembly 32 is adapted to be secured to one of the sprung and unsprung mass of vehicle 10. Valving within piston assembly 32 controls the movement of fluid between upper working chamber 44 and lower working chamber 46 during movement of piston assembly 32 within pressure tube 30. Because piston rod assembly 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38. Reserve tube 36 surrounds pressure tube 30 to define a reservoir chamber 52. A lower mount 54 seals the end of reserve tube 36. Lower mount 54 is adapted to be secured to the other of the sprung and unsprung mass of vehicle 10. Base valve assembly 38 controls fluid flow between lower working chamber 46 and reservoir chamber 52.

Figure 3:
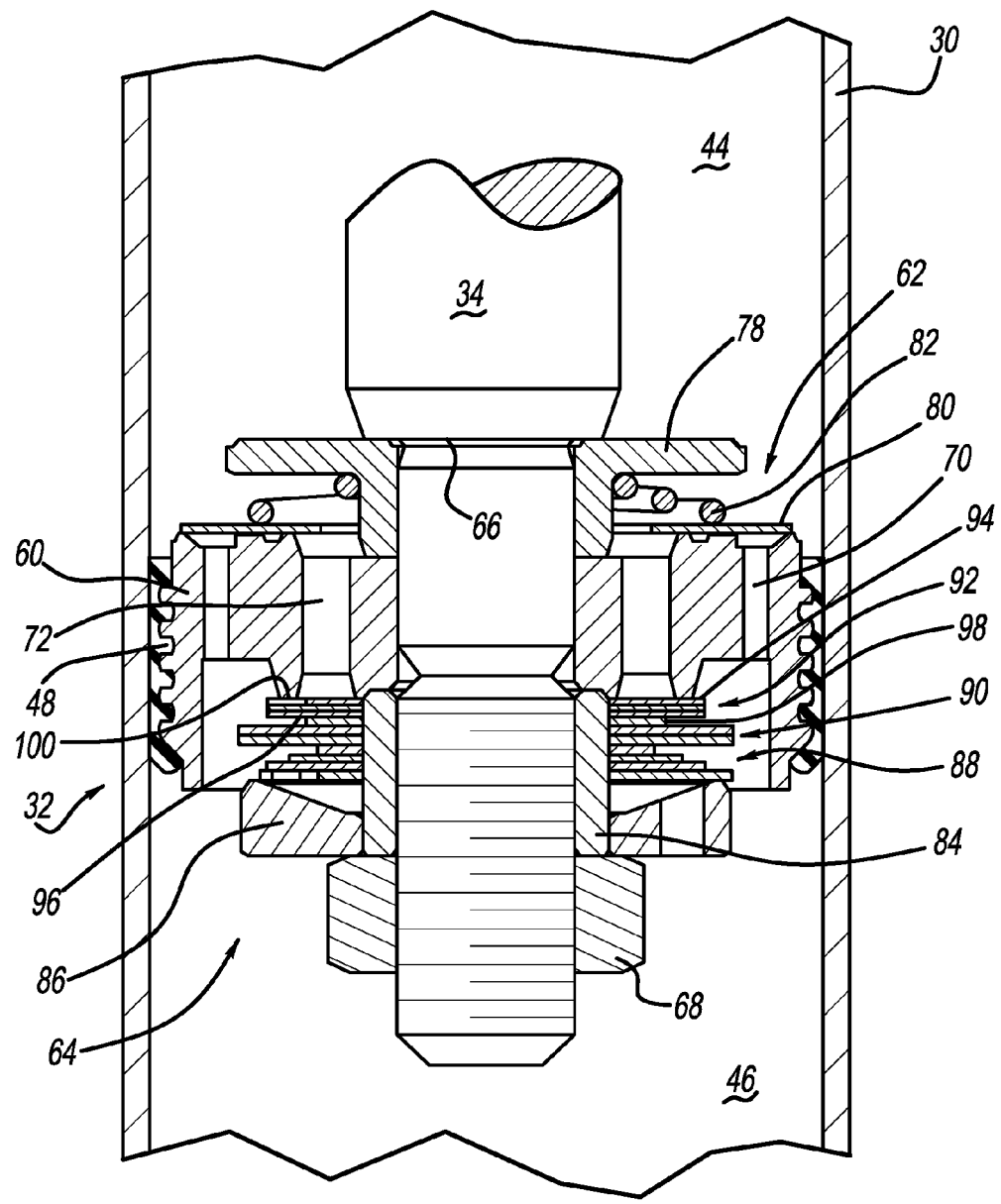
FIG. 3 is an enlarged side view, partially in cross-section, of the piston assembly from the shock absorber illustrated in FIG. 2.

Referring now to FIG. 3, piston assembly 32 comprises a valve body 60, a compression valve assembly 62 and a rebound valve assembly 64. Compression valve assembly 62 is assembled against a shoulder 66 on piston rod assembly 34. Valve body 60 is assembled against compression valve assembly 62 and rebound valve assembly 64 is assembled against valve body 60. A nut 68 secures these components to piston rod assembly 34.

Valve body 60 defines a plurality of compression passages 70 and a plurality of rebound passages 72. Seal 48 includes a plurality of ribs which mate with a plurality of annular grooves to permit sliding movement of piston assembly 32.

Compression valve assembly 62 comprises a retainer 78, a valve disc 80 and a spring 82. Retainer 78 abuts shoulder 66 on one end and valve body 60 on the other end. Valve disc 80 abuts valve body 60 and closes compression passages 70 while leaving rebound passages 72 open. Spring 82 is disposed between retainer 78 and valve disc 80 to bias valve disc 80 against valve body 60. During a compression stroke, fluid in lower working chamber 46 is pressurized causing fluid pressure to react against valve disc 80. When the fluid pressure against valve disc 80 overcomes the biasing load of spring 82, valve disc 80 separates from valve body 60 to open compression passages 70 and allow fluid flow from lower working chamber 46 to upper working chamber 44. Typically spring 82 only exerts a light load on valve disc 80 and compression valve assembly 62 acts as a check valve between chambers 46 and 44. The damping characteristics for shock absorber 20 during a compression stroke are typically controlled by base valve assembly 38 which accommodates the flow of fluid from lower working chamber 46 to reservoir chamber 52 due to the "rod volume" concept. However, compression valve assembly 62 can also contribute to the damping characteristics for shock absorber 20. During a rebound stroke, compression passages 70 are closed by valve disc 80.

Rebound valve assembly 64 comprises a guiding sleeve 84, a valve interface 86, a plurality of disc springs 88, a plurality of shim discs 90 and a plurality of flexing discs (biasing member) 92. Guiding sleeve 84 is slidingly or threadingly received on piston rod assembly 34 and is disposed between valve body 60 and nut 68. Valve interface 86, the plurality of disc springs 88, the plurality of shim discs 90 and the plurality of flexing discs 92 are all slidingly received on the outside diameter of guiding sleeve 84. Valve interface 86 directly engages nut 68, the plurality of disc springs 88 directly engage valve interface 86, the plurality of shim discs 90 directly engage the plurality of disc springs 88 and the plurality of flexing discs 92 directly engage the plurality of shim discs 90 and directly engage valve body 60.

Valve interface 86 provides support for the plurality of disc springs 88, the plurality of shim discs 90 and the plurality of flexing discs 92. The plurality of disc springs 88 elastically flex or bend to provide a specified load which biases the plurality of flexing discs 92 against valve body 60. The plurality of shim discs 90 are provided to adjust or determine the amount of flexing of the plurality of flexing discs 92 and thus they adjust or determine the amount of the specified load which biases the plurality of flexing discs 92 against valve body 60.

The plurality of flexing discs 92 include an orifice disc 94 directly abutting valve body 60, one or more tuned discs 96 and a fulcrum disc 98. When fluid pressure is applied to the plurality of flexing discs 92, a first or initial flow of fluid will flow through an optional orifice 100 defined by orifice disc 94 or valve body 60. This first or initial flow of fluid is used to tune the low speed damping and can control the steepness of the force versus velocity curve at low velocities of piston assembly 32. The number, diameter and thickness of the one or more tuned discs 96 controls the transition between low and medium velocities of piston assembly 32. Orifice disc 94 and the one or more tuned discs 96 will elastically defect or bend at fulcrum disc 98 to allow a second or additional fluid flow at the medium velocities of piston assembly 32. The plurality of flexing discs 92 combine with the preload force control of the plurality of disc springs 88 to control the lift-off point of the plurality of disc springs 88, the plurality of shim discs 90 and the plurality of flexing discs 92. A third or additional fluid flow at higher velocities of piston assembly 32 will occur when the plurality of flexing discs 92 move axially along guiding sleeve 84 due to the elastic deflection of the plurality of disc springs 88 as the inner diameter of the plurality of disc springs 88 move axially along guiding sleeve 84 while the outside diameter is held in position by valve interface 86.

During a rebound stroke, fluid in upper working chamber 44 is pressurized causing fluid pressure to react against the plurality of flexing discs 92. A first initial flow of fluid will flow through orifice 100 in orifice disc 94 at low velocities of piston assembly 32. As the velocity of piston assembly 32 increases, fluid pressure reacting against the plurality of flexing discs 92 increases and eventually overcomes the bending load for the plurality of flexing discs 92 and the plurality of flexing discs 92 elastically deflect opening the plurality of rebound passages 72 allowing a second fluid flow from upper working chamber 44 to lower working chamber 46. The design and strength of the plurality of flexing discs 92 and the size of the plurality of rebound passages 72 will determine the damping characteristics for shock absorber 20 in rebound. As the velocity of piston assembly 32 increases further, the fluid pressure within upper working chamber 44 reaches a predetermined level and the fluid pressure will cause the plurality of flexing discs 92 to lift-off of valve body 60. The lift-off of the plurality of flexing discs 92 causes the plurality of flexing discs 92, the plurality of shim discs 90 and the plurality of disc springs 88 to move axially along the outer diameter of guiding sleeve 84 fully opening rebound passages 72 creating a third fluid flow.

Figure 4:
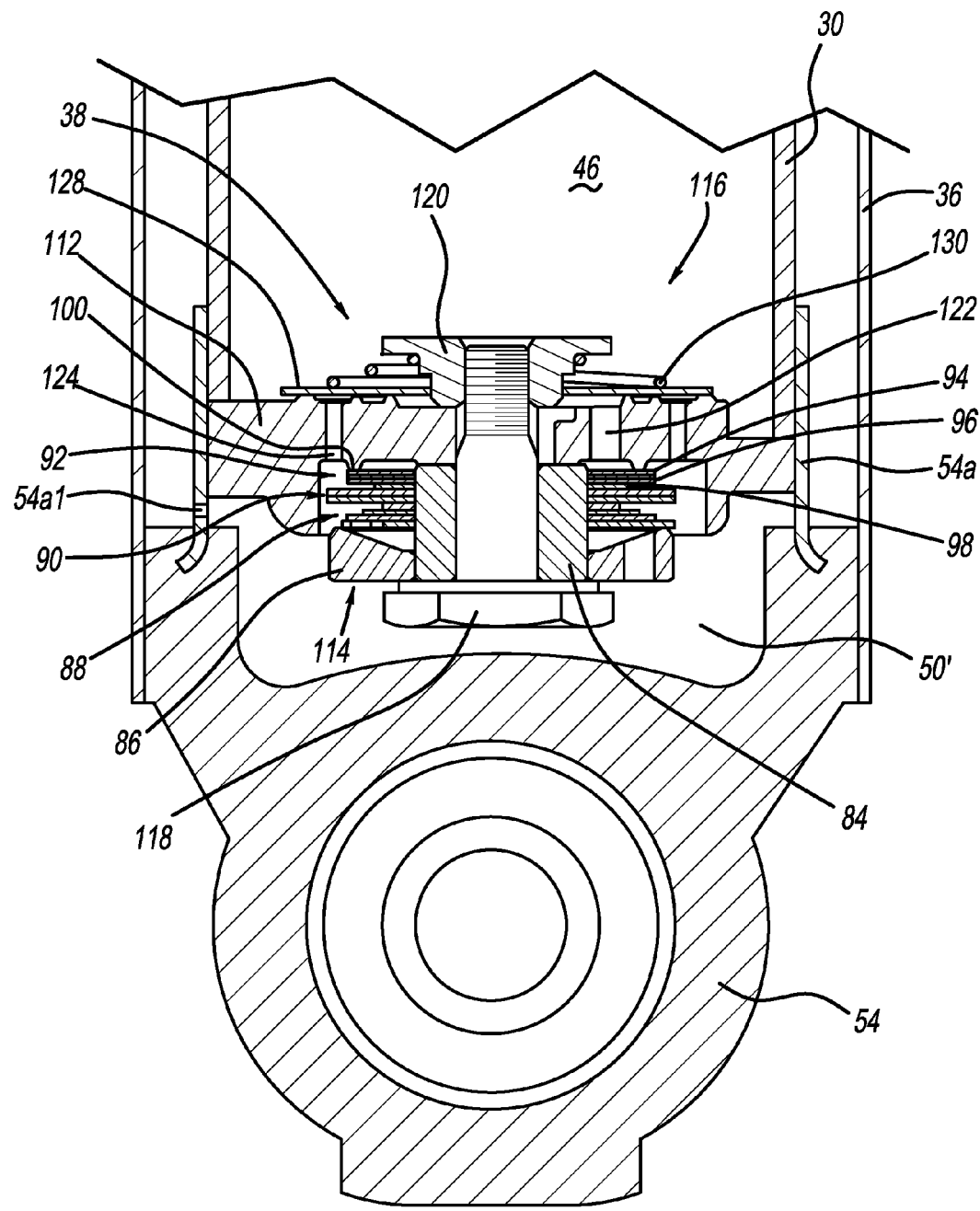
FIG. 4 is an enlarged side view, partially in cross-section, of the base valve assembly from the shock absorber illustrated in FIG. 2.

Referring to FIG. 4, base valve assembly 38 comprises a valve body 112, a compression valve assembly 114 and a rebound valve assembly 116. Compression valve assembly 114 and rebound valve assembly 116 are attached to valve body 112 using a bolt 118 and a nut 120. The tightening of nut 120 biases compression valve assembly 114 towards valve body 112. Valve body 112 defines a plurality of compression passages 122 and a plurality of rebound passages 124.

Rebound valve assembly 116 comprises a valve disc 128 and a valve spring 130. Valve disc 128 abuts valve body 112 and closes rebound passages 124. Valve spring 130 is disposed between nut 120 and valve disc 128 to bias valve disc 128 against valve body 112. During a rebound stroke, fluid in lower working chamber 46 is reduced in pressure causing fluid pressure in reservoir chamber 52 to react against valve disc 128. When the fluid pressure against valve disc 128 overcomes the biasing load of valve spring 130, valve disc 128 separates from valve body 112 to open rebound passages 124 and allow fluid flow from reservoir chamber 52 to lower working chamber 46. Typically valve spring 130 exerts only a light load on valve disc 128 and compression valve assembly 114 acts as a check valve between reservoir chamber 52 and lower working chamber 46. The damping characteristics for a rebound stroke are controlled by rebound valve assembly 64 as detailed below but rebound valve assembly 116 can be designed to contribute to the damping characteristics.

Compression valve assembly 114 is the same as rebound valve assembly 64 but it is attached to valve body 112 to control fluid flow from lower working chamber 46 to reservoir chamber 52 during a compression stroke of shock absorber 20.

Compression valve assembly 114 comprises guiding sleeve 84, valve interface 86, the plurality of disc springs 88, the plurality of shim discs 90 and the plurality of flexing discs 92. Guiding sleeve 84 is slidingly or threadingly received on bolt 118 and is disposed between valve body 112 and the head of bolt 118. Valve interface 86, the plurality of disc springs 88, the plurality of shim discs 90 and the plurality of flexing discs 92 are all slidingly received on the outside diameter of guiding sleeve 84. Valve interface 86 directly engages bolt 118, the plurality of disc springs 88 directly engage valve interface 86, the plurality of shim discs 90 directly engage the plurality of disc springs 88 and the plurality of flexing discs 92 directly engage the plurality of shim discs 90 and directly engage valve body 112.

Valve interface 86 provides support for the plurality of disc springs 88, the plurality of shim discs 90 and the plurality of flexing discs 92. The plurality of disc springs 88 flex or bend to provide a specified load which biases the plurality of flexing discs 92 against valve body 112. The plurality of shim discs 90 are provided to adjust or determine the amount of flexing of the plurality of flexing discs 92 and thus they adjust or determine the amount of the specified load which biases the plurality of flexing discs 92 against valve body 112.

The plurality of flexing discs 92 include orifice disc 94 directly abutting valve body 112, the one or more tuned discs 96 and fulcrum disc 98. When fluid pressure is applied to the plurality of flexing discs 92, a first or initial flow of fluid will flow through orifice 100 defined by orifice disc 94 or valve body 112. This first or initial flow of fluid is used to tune the low speed damping and can control the steepness of the force versus velocity curve at low velocities of piston assembly 32. The number, diameter and thickness of the one or more tuned discs 96 controls the transition between low and medium velocities of piston assembly 32. Orifice disc 94 and the one or more tuned discs 96 will defect or bend to allow a second or additional fluid flow at the medium velocities of piston assembly 32. The plurality of flexing discs 92 combine with the preload force control of the plurality of disc springs 88 to control the lift-off point of the plurality of disc springs 88, the plurality of shim discs 90 and the plurality of flexing discs 92. A third or additional fluid flow at higher velocities of piston assembly 32 will occur when the plurality of flexing discs 92 move axially along guiding sleeve 84 due to the elastic deflection of the plurality of disc springs 88 as the inner diameter of the plurality of disc springs 88 move axially along guiding sleeve 84 while the outside diameter is held in position by valve interface 86.

During a compression stroke, fluid in lower working chamber 46 is pressurized causing fluid pressure to react against the plurality of flexing discs 92. A first or initial flow of fluid will flow through orifice 100 in orifice disc 94 at low velocities of piston assembly 32. As the velocity of piston assembly 32 increases, fluid pressure reacting against the plurality of flexing discs 92 increases and eventually overcomes the bending load for the plurality of flexing discs 92 and the plurality of flexing discs 92 elastically deflect opening the plurality of compression passages 122 allowing a second fluid flow from lower working chamber 46 to chamber 50', through one or more openings 54a1 in a metal insert 54a, and to reservoir chamber 52. The design and strength of the plurality of flexing discs 92 and the size of the plurality of compression passages 122 will determine the damping characteristics for shock absorber 20 in compression. As the velocity of piston assembly 32 increases further, the fluid pressure within lower working chamber 46 reaches a predetermined level and the fluid pressure will cause the plurality of flexing discs 92 to lift-off of valve body 112. The lift-off of the plurality of flexing discs 92 causes the plurality of flexing discs 92, the plurality of shim discs 90 and the plurality of disc springs 88 to move axially along the outer diameter of guiding sleeve 84 to fully open compression passages 122 creating a third fluid flow.

As illustrated in the figures, shock absorber 20 has its structural strength built up by having a strong pressure tube 30 and a relatively weak reserve tube 36. The function of reserve tube 36 is to maintain the hydraulic fluid within reservoir chamber 52, provide for the sealing of reservoir chamber 52 (airtight) and possibly be available to connect other vehicle components such as springs, brake lines, etc. Reserve tube 36 is also required to withstand any impacts from the outside environment. The structural strength of pressure tube 30 is designed to withstand the bending, compression, tension and twisting loads experienced by shock absorber 20 during operation of vehicle 10. Thus, the structural integrity of pressure tube 30 is greater than the structural integrity of reserve tube 36. The greater structural integrity of pressure tube 30 can be accomplished by pressure tube 30 having a greater wall thickness than reserve tube 36, pressure tube 30 can be manufactured from a material the same as or different than reserve tube 36 to have the greater structural integrity or any other means known in the art for providing pressure tube 30 with the greater structural integrity can be utilized.

Reserve tube 36 can be manufactured from a plastic material, a metal material such as aluminum or thin-walled pre-painted steel or any other material which meets the performance requirements. The flow of oil and the generation of damping loads for shock absorber 20 is the same as typical prior art dual-tube shock absorbers.

Figure 5:
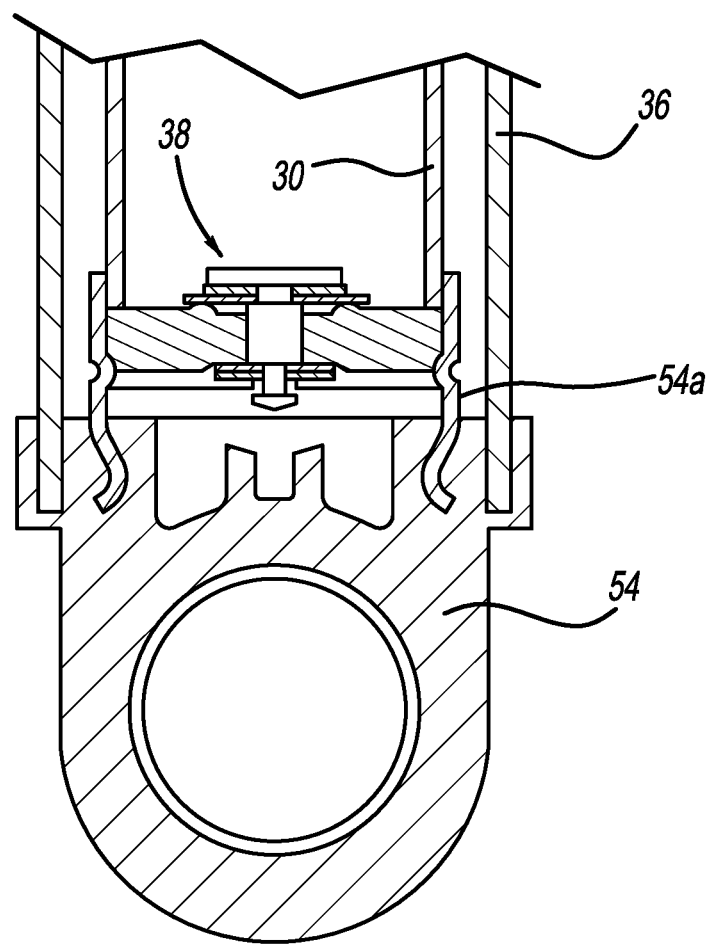
FIG. 5 is a side view, partially in cross-section, illustrating an attachment of the base valve assembly and lower mount illustrated in accordance with another embodiment of the present disclosure.

Lower mount 54 is manufactured from a plastic material with the option of having one or more of the metal inserts 54a. The metal inserts 54a provide the opportunity to have a welding attachment to pressure tube 30 as illustrated in FIG. 4 and in FIG. 5.

Figure 6:
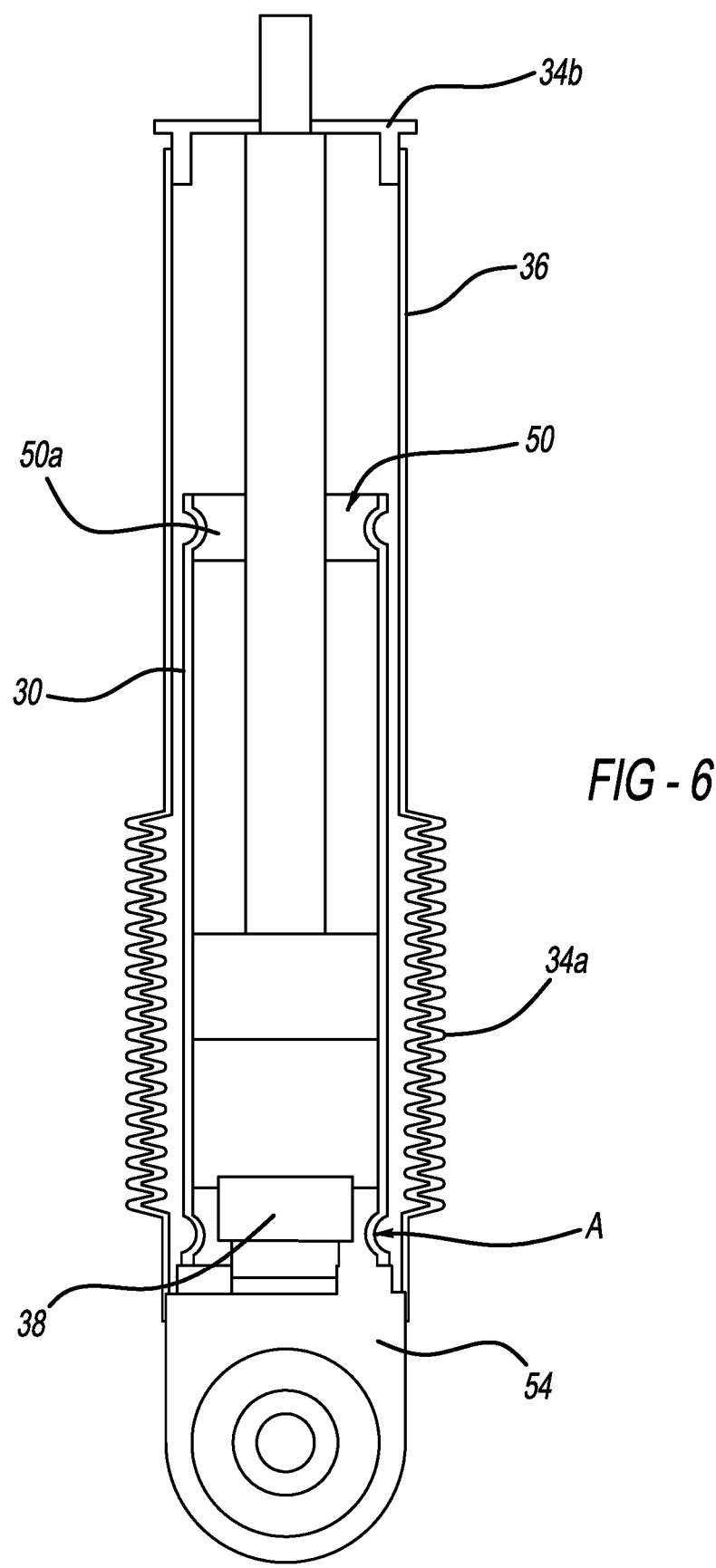
FIG. 6 is a side view, partially in cross-section, of a dual-tube shock absorber in accordance with another embodiment of the present disclosure.

Base valve assembly 38 is press fit within the one or more metal inserts 54a and can be positioned on plastic ribs formed on lower mount 54. An alternate connection for base valve assembly 38 is illustrated in FIG. 6. As illustrated in FIG. 6, base valve assembly 38 is directly press-fit in the lower mount 54. In this design, pressure tube 30 can be crimped or rolled around lower mount 54 and base valve assembly 38 as illustrated by arrow A. The opposite end of pressure tube 30 which engages rod guide assembly 50 is welded, press-fit, mechanically connected or attached in any way known in the art to a rod guide housing 50a of rod guide assembly 50. As an alternative, pressure tube 30 can extend up to an oil seal 50b of rod guide assembly 50 and be attached directly to oil seal 50b by any means known in the art (see FIG. 7).

Reserve tube 36 also engages rod guide assembly 50 and can be attached directly to rod guide housing 50a of rod guide assembly 50, directly attached to oil seal 50b of rod guide assembly 50 or directly attached to a bumper cap 50c which is also a component of rod guide assembly 50. In an alternate design as illustrated in FIG. 6, reserve tube 36 is attached to lower mount 54 and can be designed with a telescopic geometry such as bellows 34a or with material having a flexibility and can be connected opposite to the lower mount 54 with a connector 34b which is a component of piston rod assembly 34. In this design, there is no requirement for an oil seal or for corrosion protection for a piston rod 34b of piston rod assembly 34. It will be understood by one skilled in the art, that while the flexible component that prevents load transfer is shown at a central position between the distal ends of the reserve tube 36, the placement of the flexible component could also be positioned between the lower mount 54 and the reserve tube 36, or between the pressure tube 30 and the reserve tube 36, or between the rod guide assembly 50 and the pressure tube 36, or between the piston rod assembly 34 and the reserve tube 36.

Bumper cap 50c allows for longitudinal expansion of reserve tube 36 due to the fact that a plastic reserve tube 36 may have a thermal expansion rate which is different than a thermal expansion rate of a steel tube such as pressure tube 30. The role of bumper cap 50c can be both to transfer forces from bumper cap 50c and to prevent reserve tube 36 from expanding due to internal pressure within reservoir chamber 52.

Figure 7:
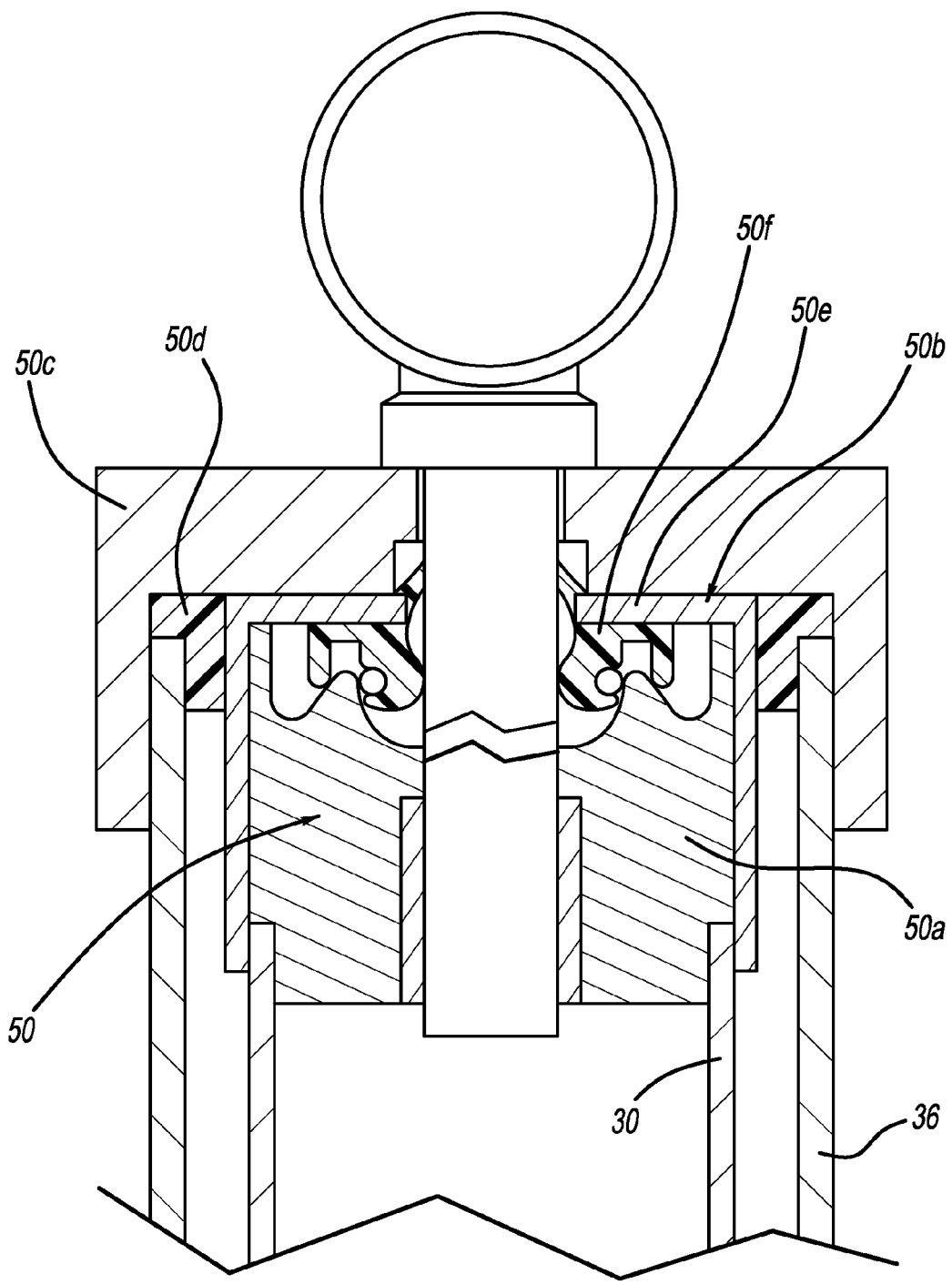
FIG. 7 is a side view of a rod guide assembly in accordance with another embodiment of the present disclosure.

Elastomeric bushing 140 can be press fit within lower mount 54 which would be similar to prior art bushings or in an alternative design, elastomeric bushing 140 can be over molded in a plastic mold when forming lower mount 54 using a multi-step injection process. In a preferred embodiment, this over molding is done with polyurethane, but other rubber, elastomeric, rubber-like or plastic materials can be used. This multi-step injection process can eliminate components, extra handling and extra assembly steps. As illustrated in FIG. 7, rod guide assembly 50 can include metal or plastic rod guide housing 50a, oil seal assembly 50b and a plastic plug 50d. Oil seal assembly 50b includes a washer 50e which extends over and around rod guide housing 50a to provide for the welding or other attachment means for pressure tube 30 and a seal 50f. Plastic plug 50d provides sealing between oil seal 50b and reserve tube 36. Gaps in washer 50e allow oil return from oil seal 50b to reservoir chamber 52.

Figure 8:
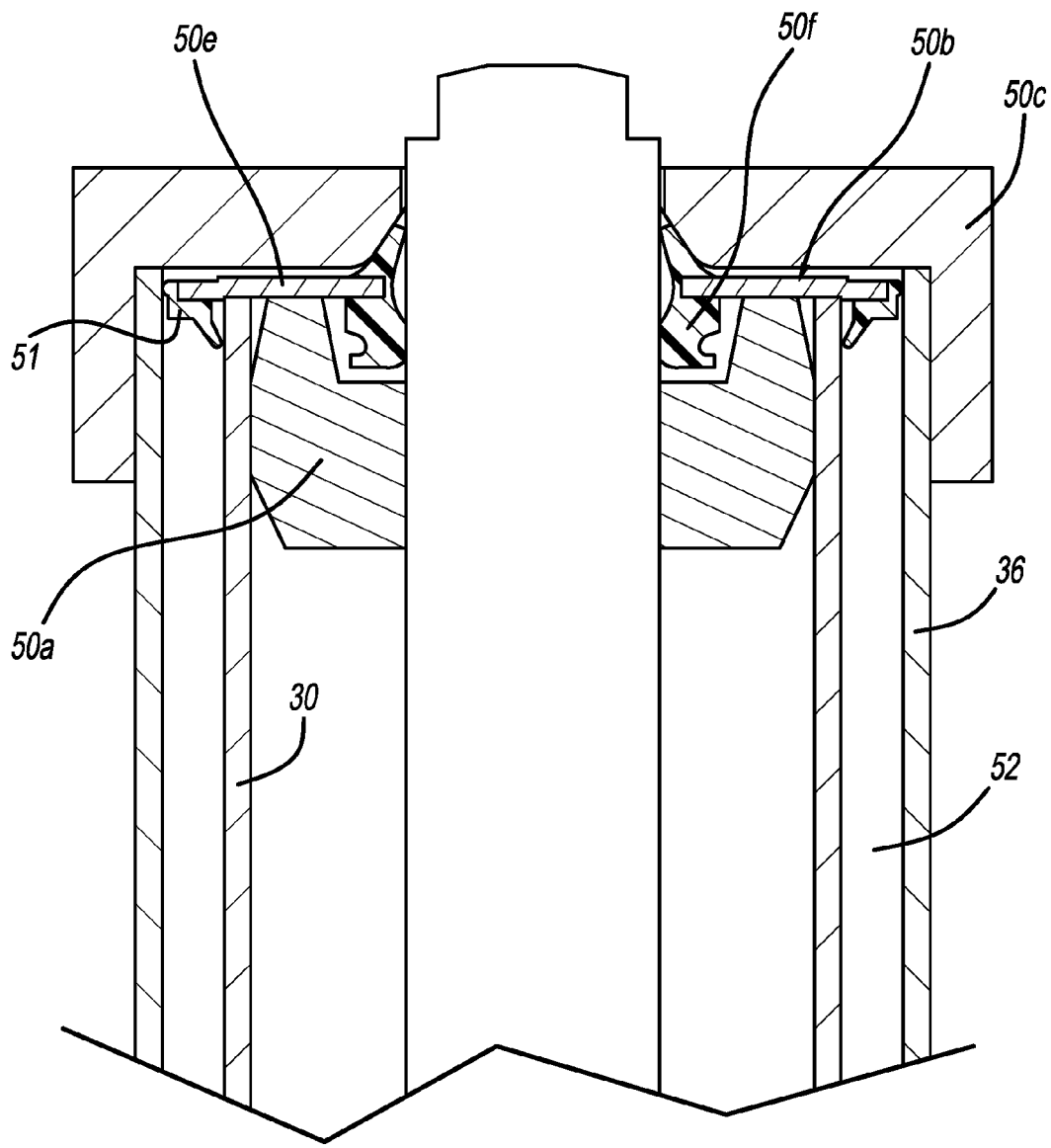
FIG. 8 is a side view of a rod guide assembly in accordance with another embodiment of the present disclosure.

As illustrated in FIG. 8, a metal or plastic rod guide housing 50a is disposed within pressure tube 30 and pressure tube 30 extends up to oil seal assembly 50b where it is welded or otherwise attached to oil seal 50b. A non-return valve 51 is located on the outer side of pressure tube 30 to provide for oil return to reservoir chamber 52. Oil seal assembly 50b directly engages pressure tube 30 and reserve tube 36 or is directly attached to reserve tube 36 and/or pressure tube 30.

Figure 9:
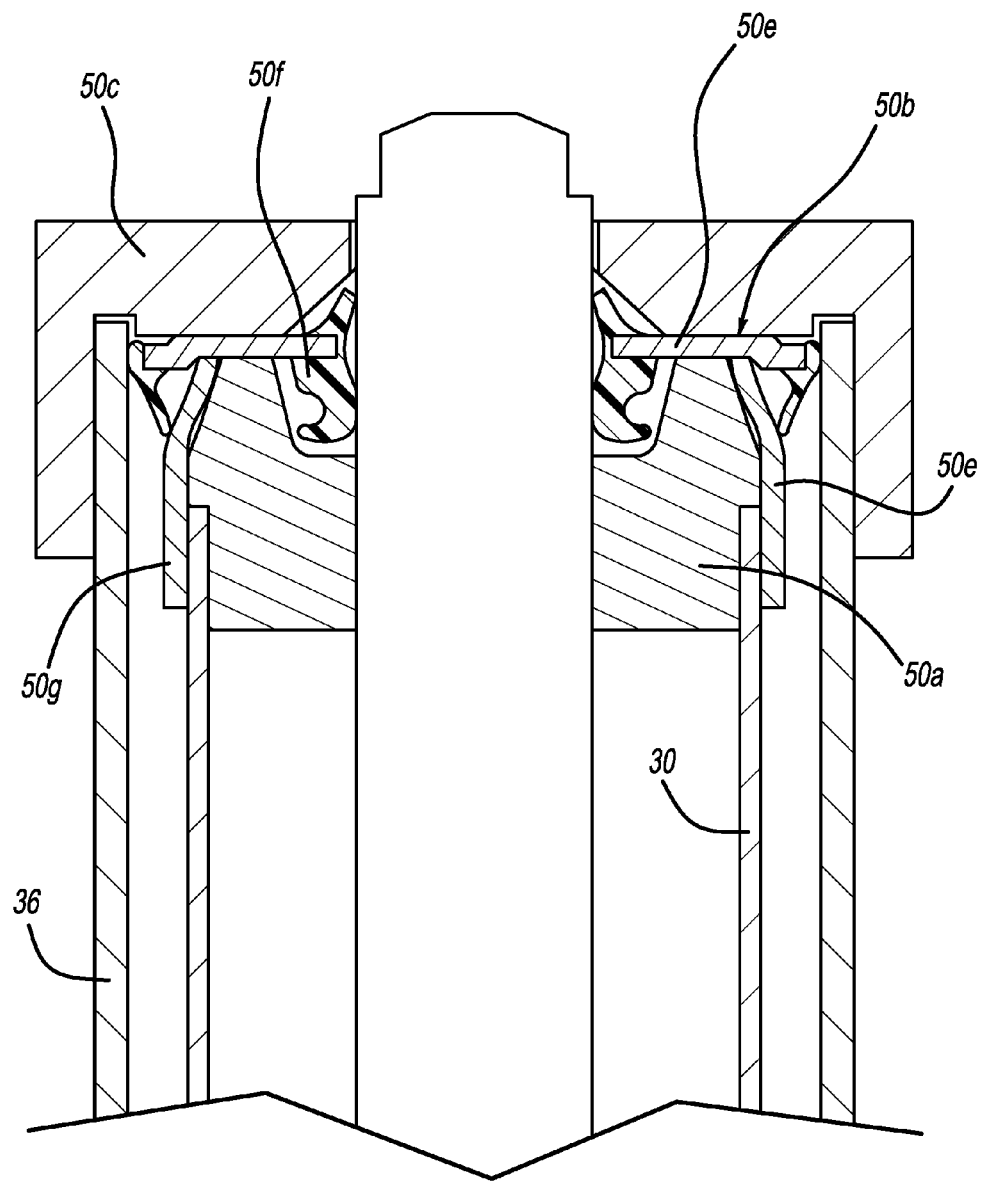
FIG. 9 is a side view of a rod guide assembly in accordance with another embodiment of the present disclosure.

As illustrated in FIG. 9, a metal or plastic rod guide housing 50a is partially disposed within pressure tube 30. Oil seal assembly 50b is welded or otherwise attached to a steel sleeve 50g which is welded or otherwise attached to pressure tube 30. A non-return valve is located on the outer surface of pressure tube 30 to provide for oil return to reservoir chamber 52. Oil seal assembly 50b directly engages reserve tube 36 and pressure tube 30 or is directly attached to reserve tube 36 and/or pressure tube 30.

Figure 10:
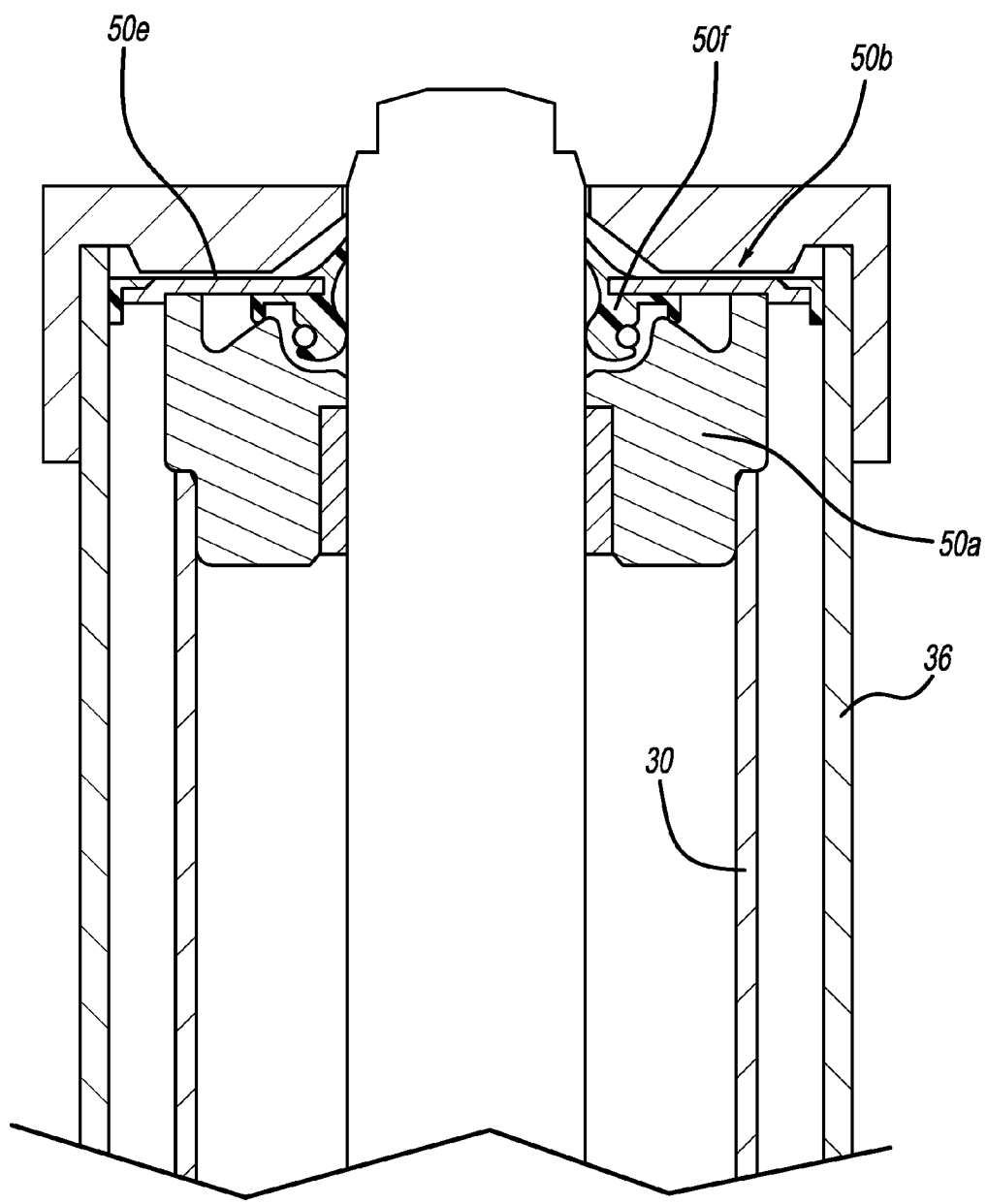
FIG. 10 is a side view of a rod guide assembly in accordance with another embodiment of the present disclosure.

As illustrated in FIG. 10, metal or plastic rod guide housing 50a is partially disposed within pressure tube 30. Pressure tube 30 is welded, crimped, rolled or otherwise secured directly to rod guide housing 50a. Oil seal assembly 50b includes washer 50e which is welded or otherwise attached to metal or plastic rod guide housing 50a and also attached to or directly engages reserve tube 36.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A twin tube shock absorber comprising:
a pressure tube defining a fluid chamber;
a piston assembly fixed to a piston rod and disposed within the fluid chamber, the piston assembly dividing the fluid chamber into an upper working chamber and a lower working chamber;
a lower mount;
a rod guide assembly;
the pressure tube extending between the lower mount and the rod guide assembly and being in load bearing contact with both the lower mount and the rod guide assembly, so as to be fixed against movement relative to the lower mount and the rod guide assembly, and to act as a principal load bearing component for the shock absorber;

a reserve tube surrounding the pressure tube and being in contact with the lower mount, a reservoir chamber being defined between the reserve tube and the pressure tube;

a bumper cap attached directly to an outer surface of the reserve tube and including an aperture in receipt of the piston rod; and a flexible sealing component positioned between the pressure tube and the reserve tube preventing a transfer of the load therebetween such that the bumper cap and reserve tube are isolated from the loads passing through the pressure tube, the flexible sealing component sealing the reservoir chamber; wherein a structural integrity of the pressure tube is greater than a structural integrity of the reserve tube, and the reserve tube operating to provide substantially no load bearing operation for the shock absorber.

2. The shock absorber according to claim 1, wherein the pressure tube has a larger wall thickness than a wall thickness of the reserve tube.

3. The shock absorber according to claim 1, wherein the pressure tube is manufactured from a different material than the reserve tube.

4. The shock absorber according to claim 1, wherein the pressure tube is a metal pressure tube and the reserve tube is a plastic reserve tube.

5. The shock absorber according to claim 3, wherein the reserve tube has a telescopic geometry and is operably secured to the lower mount.

6. The shock absorber according to claim 5, wherein the telescopic geometry includes a bellows.

7. The shock absorber according to claim 1, wherein the reserve tube has a telescopic geometry and is operably secured to the lower mount.

8. The shock absorber according to claim 7, wherein the telescopic geometry includes a bellows.

9. The shock absorber according to claim 1, further comprising a mount attached to one of the pressure tube and the piston assembly.

10. The shock absorber according to claim 9, wherein the lower mount includes an insert for interfacing a distal end of the pressure tube to the lower mount in a manner enabling the pressure tube to act as the principal load bearing component of the shock absorber.

11. The shock absorber according to claim 10, wherein the insert is welded to the distal end of the pressure tube and is further configured to help secure a valve assembly in place at the distal end of the pressure tube.

12. A method for forming a shock absorber, comprising:
using a pressure tube to define a fluid chamber;
arranging a piston assembly within said fluid chamber, the piston assembly dividing the fluid chamber into an upper working chamber and a lower working chamber; and arranging a reserve tube to surround the pressure tube such that a reservoir chamber is defined between the reserve tube and the pressure tube;

forming the pressure tube from at least one of a material thickness or a material type to provide a first structural strength;

operably securing a distal end of the pressure tube to a lower mount;

forming the reserve tube from at least one of a material thickness or a material type to provide a second structural strength;

selecting the first and second structural strengths such that the second structural strength is less than the first structural strength;

spacing the reserve tube apart from the pressure tube such that the reserve tube provides substantially no load bearing operation for the shock absorber, and further securing the pressure tube such that the pressure tube provides a principal load bearing operation for the shock absorber; and positioning a flexible sealing component between the pressure tube and the reserve tube to seal an end of the reserve tube and at least partially define a reservoir chamber between the pressure tube and the reserve tube.

13. The method of claim 12, further comprising at least one of:
forming the pressure tube with a larger wall thickness than a wall thickness of the reserve tube; or
forming the pressure tube from metal and the reserve tube from a material providing a lesser structural strength than metal.

14. A shock absorber comprising:
a pressure tube defining a fluid chamber;
a piston assembly disposed within the fluid chamber, the piston assembly dividing the fluid chamber into an upper working chamber and a lower working chamber;
a lower mount to which a first end of the pressure tube is fixed;
a rod guide assembly to which a second end of the pressure tube is operably secured;
a bumper cap operably associated with the rod guide assembly;
a reserve tube surrounding the pressure tube and extending between the bumper cap and the lower mount, a reservoir chamber being defined between the reserve tube and said pressure tube;
a structural integrity of the pressure tube being greater than a structural integrity of the reserve tube; and
wherein the reserve tube includes a first end fixed to the lower mount and a second end fixed to the bumper cap, the reserve tube and the pressure tube each including second opposite ends that are spaced apart from one another to enable a degree of movement of the second end of the reserve tube relative to the second end of the pressure tube.

* * * * *